Sept. 9, 1969    J. G. PECIS ET AL    3,465,776
ADD-ON BALANCED PRESSURE UNIT
Filed March 31, 1965
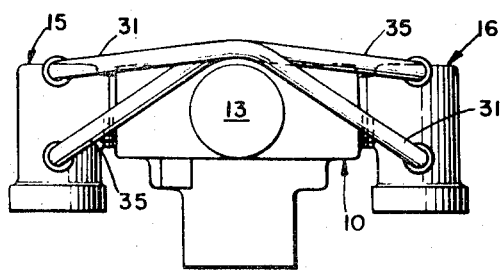
FIG.1.
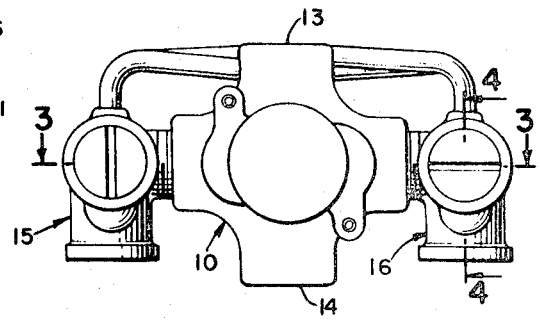
FIG.2.
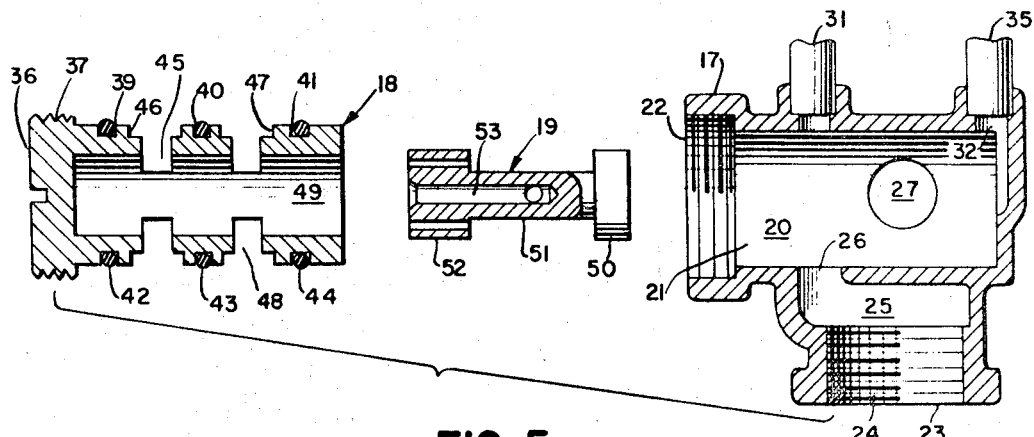
FIG.5.
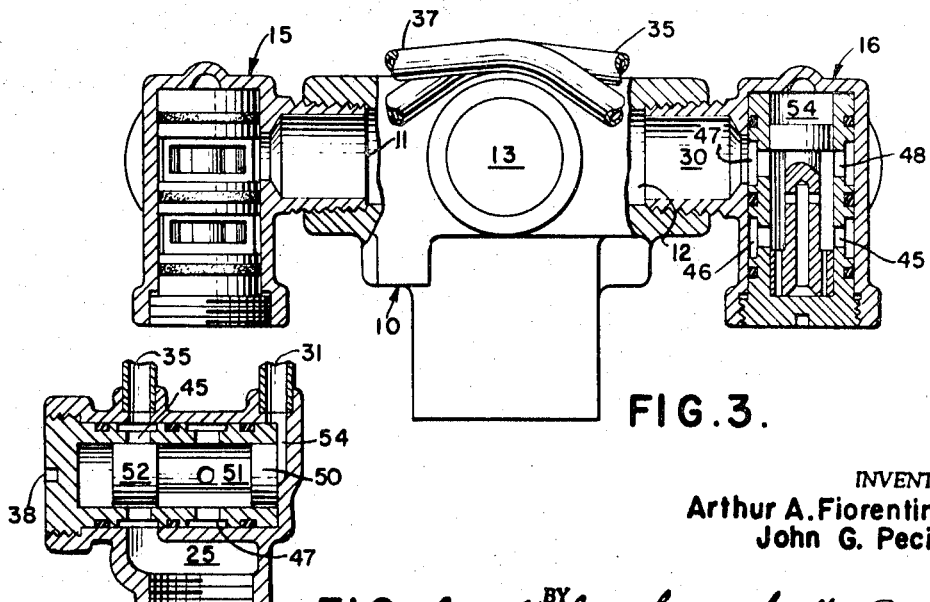
FIG.3.
FIG.4.
INVENTORS
Arthur A. Fiorentino &
John G. Pecis
BY Holcombe, Wetherill & Brisebois
ATTORNEYS 3,465,776
ADD-ON BALANCED PRESSURE UNIT
John G. Pecis, Wilmington, and Arthur A. Fiorentino, Newark, Del., assignors to Speakman Company, Wilmington, Del., a corporation of Delaware
Filed Mar. 31, 1965, Ser. No. 444,144
Int. Cl. G05d 11/00; F16k 31/143, 31/163
U.S. Cl. 137—100      6 Claims

ABSTRACT OF THE DISCLOSURE

Flow control apparatus for continually equalizing discharge temperature of fluid derived from hot and cold pressurized fluid sources and discharged from common mixing outlet comprises independent pair of flow control units each having regulating cavity with inlet port connected to one of fluid sources and outlet port connected to common outlet. Free floating valve member within each cavity has face portion defining with one wall of cavity variable volume static fluid chamber and skirt portion for modulating flow from inlet port through cavity to outlet port. Static fluid passages interconnect static fluid chamber of each cavity with inlet port of other cavity so that pressure differentials in one fluid source shift valve member to modulate flow from other fluid source.

---

This invention relates to a mixing valve and to a unit that may be added thereto to control the amount of one component admitted thereto in proportion to the pressure of the other component.

Heretofore mixing valves have been provided with devices that will limit the amount of hot water in accordance with the pressure of the cold water. This has always required a floating piston having a double valve unit that restricts both the hot and cold water in proportion to their respective pressures. This unit has always been built into the valve.

It is an object of the present invention to provide a unit that may be added to a standard valve to supply pressure control thereof without altering the construction of the valve.

It is another object of the present invention to provide a unit that may be attached to the cold water and hot water inlet ports of the standard valve unit that will prevent the change in temperature of the mixed water delivered by a valve due to fluctuation in pressure of either the hot or cold water lines.

It is still a further object of the present invention to provide a unit that may be applied to a standard valve where the piston and the sleeve are accessible from the front of the valve assembly after installation, without dismounting the valve assembly.

These and other objects will be apparent from the following description and drawings, in which:

FIGURE 1 is a horizontal plan view of a valve with the two control units mounted thereon.

FIGURE 2 is a vertical plan view similar to FIG. 1.

FIGURE 3 is a view, partially in section, taken on the line 3—3 of FIGURE 2.

FIGURE 4 is a sectional view on line 4—4 of FIG. 2.

FIGURE 5 is an expanded view of the unit shown in FIGURE 4.

As shown in the drawings, the manually controlled valve 10 has the hot water inlet port 11 and the cold water inlet port 12 and mixed water discharge ports 13 and 14. This valve unit is of any desired type, the one particularly used, for purposes of illustration, is a shower valve. The mixed water discharge port 13 is connected to the shower, while the discharge port 14 is connected to the tub. A control unit 15 is mounted in the inlet port 11 to control the hot water admitted thereto and a similar unit 16 is mounted in the cold water inlet port 12. While the control units 15 and 16 are illustrated in the preferred embodiment as being directly connected to a mixing valve 10, they obviously may be located anywhere in the hot and cold water mains leading to one or more mixing valves. It is desirable, however, that the water mains not be widely separated in order to facilitate installation of the static water passages 31 and 35.

This flow control unit comprises a cup-shaped housing or body portion 17, a sleeve portion or second cup-shaped housing of the spool type 18 and a free floating valve member or piston 19.

The body portion 17 has a longitudinal, cylindrical bore 20, open at the lower end 21, and provided with screw threads 22 to hold the sleeve portion 18 therein. This body portion is provided with a cold water inlet port 23 having screw threads 24 for attachment to the cold water main (not shown). This inlet port discharges the water into the inlet chamber 25 from which the water is discharged through the inlet port 26 into the bore 20. The water is discharged from this bore through port 27 into the discharge chamber 30, from which the water flows into the inlet port 12 of the valve 10. A static water conduit 35 admits water from the hot water main to the end of the body portion 17 through the inlet port 32. A static cold water conduit 31 admits cold water at the pressure in the cold water main (not shown). This conduit 31 is connected to the upper portion of the hot water control unit 15.

The sleeve portion 18 is circular in cross section to be received in the bore 20 and held in position therein by the lower solid portion 36 provided with screw threads 37 which are received in and held by the screw threads 22 on the lower part of the body portion 17. The solid portion 36 is provided with a slot 38 to receive a tool to rotate the sleeve 18 to cause the threads 37 and 22 to hold it in position. This sleeve portion has three grooves 39, 40 and 41 spaced along its length. Each groove is provided with O-rings 42, 43 and 44 which hold the sleeve portion in water-tight engagement with the longitudinal bore 20 of the body portion. This sleeve portion is provided with a water inlet port 45 which registers with the inlet port 26 of the body portion and has the inlet chamber 46 therebetween. This inlet port is between the O-rings 42 and 43. The outlet port 48 registers with the outlet port 27 of the body portion and has the outlet chamber 47 therebetween. This outlet port is between O-rings 43 and 44. The inlet port and the outlet port are thereby held in water-tight relationship with each other, so that water cannot bleed from the inlet port to the outlet port along the inner surface of the bore 20 in the body portion. This sleeve portion is provided with an internal circular bore 49, to receive and hold in free floating engagement therewith, the piston 19.

The free floating piston 19 is received in and held in floating engagement with the bore 49. This piston has an upper solid face portion 50, a stem portion 51 and a skirt portion 52 for modulating fluid flow through the cylindrical regulating cavity 49. The stem portion 51 has the longitudinal conduit 53 and a transverse passageway that connects the conduit to the exterior of the piston to transfer water to below the skirt portion 52.

In operation the sleeve portion and the piston are mounted in the bore 20 of the body portion 17, as shown in FIGURES 3 and 4. The hot water is admitted through the static water inlet port 32 at the pressure of the hot water main and the cold water is admitted through the cold water inlet port 23 where it flows through the chamber 25, through the inlet port 45 and when the hot and cold water are in balanced relation, the cold water flows into the cold water discharge chamber 30. The skirt portion 52 of the piston is below the inlet port 45 and allows free flow of the cold water from the cold water main to the valve 10. If for any reason the hot water pressure should decrease and the pressure within the inlet port 32 is decreased and the pressure in the variable volume static water chamber 54 above the free floating piston 19 is decreased, then the piston would assume the position shown in FIG. 4. The skirt portion 52 would then close the inlet port 45 and the flow of the cold water would be interrupted until such a time as the hot water pressure is reestablished to move the free floating piston downwardly. If the hot water pressure drops slightly the floating piston assumes its position intermediate that shown in FIGURES 3 and 4 and the cold water flow is controlled in proportion to the pressure in the hot water main.

While the control unit 16 on the cold water side has been described, the hot water unit 15 on the hot water side functions in the same manner to control the flow of hot water in proportion to the pressure in the cold water main.

When it is desired to remove the piston, the sleeve member 18 is rotated so that the screw threads 37 release this sleeve member from the body portion 17. The sleeve member and the piston are removed as a unit and may be repaired or replaced as desired. This does not require the disassembling of the main valve 10.

The separate installations, one on the cold water and one on the hot water side of the valve, permit assembly on most concealed mixing valves of both the single handle and the two handle type. The free floating piston is accessible from the front of the mixing valve in most installations. Each of the free floating piston and sleeve assemblies may be removed from its position for cleaning and replacement. These inlet ports of both units are in full open position when the line pressures are equal, allowing maximum flow for given combinations of piston diameter, stroke and port size. Conventionally designed floating pistons block one half of each port area under balanced inlet pressure conditions, and therefore do not operate at maximum efficiency.

While in the above unit a three piece structure has been described, that is, a valve body, a sleeve within the body and a free floating piston within the sleeve, this is only so described as a matter of convenience and this unit may be constructed without the sleeve, the piston operating directly in the chamber of the valve body.

It has been found that when the units disclosed herein are mounted on a valve that the discharge temperature is maintained within ±3° F., even when there is a fluctuation in pressure of 75% of the original line pressure in either the hot or cold water supply lines.

It has also been found that a total mixed flow of over 5½ gallons per minute passes through the balanced pressure devices with the inlet line pressure of 45 p.s.i. unless the mixing valve in the assembly causes greater flow restriction than that caused by the balanced pressure devices. If one supply pressure fails, the balanced pressure device on the opposite supply line closes the inlet port, permitting no flow greater than 20 ozs. per minute until the pressure is restored.

Unlike conventional designs, free floating piston temperature control units of the present application improve as supply line pressure, and corresponding discharge flows are reduced.

What is claimed is:

1. Flow control apparatus for continually equalizing the discharge temperature of fluid derived from hot and cold pressurized fluid sources and discharged from a common mixing outlet comprising an independent pair of flow control units each having a regulating cavity with an inlet port connected to one of the fluid sources and an outlet port connected to the common outlet, a free floating valve member within each cavity having a face portion defining with one wall of the cavity a variable volume static fluid chamber and having a skirt portion for modulating flow from the inlet port through the cavity to the outlet port, static fluid passages inter-connecting the static fluid chamber of each cavity with the inlet port of the other cavity whereby pressure differentials in one fluid source shift the valve member to modulate the flow from the other fluid source.

2. Flow control apparatus according to claim 1 wherein each regulating cavity has a removable closure at one end thereof comprising a sleeve member received in the cavity and having an inlet port and an outlet port co-operating with the corresponding ports in the cavity whereby access to the valve member is facilitated.

3. A flow control unit comprising a housing defining a regulating cavity having an inlet adapted to be connected with a first pressurized fluid source and an outlet adapted to be connected with a common discharge means, a free floating valve member within the housing having a face portion defining with one wall of the housing a static fluid chamber and having a skirt portion for modulating fluid flow through the housing, and a static fluid passage communicating with the static fluid chamber and adapted to be connected with a second pressurized fluid source.

4. A flow control unit according to claim 3 wherein the housing has a removable closure including a sleeve member between the valve member and the housing and having inlet and outlet openings corresponding to those in the housing.

5. An add-on balanced pressure assembly for continuously equalizing the discharge temperature of fluid derived from a pressurized hot fluid source and a pressurized cold fluid source and discharged from the common outlet of a mixing valve comprising a pair of substantially identical flow control units, each unit including a first open-ended cup-shaped housing having a first laterally directed extension forming an inlet passage adapted to be connected to one of the fluid sources and a second laterally directed extension forming an outlet passage adapted to be connected to the mixing valve, a second open-ended cup-shaped housing removably received within the first cup-shaped housing to define a substantially cylindrical regulating cavity, radial passage means through the second housing providing communication between the regulating cavity and the outlet passage, a radial inlet port through the second housing to provide communication between a pressurized fluid source and the regulating cavity, a spool type valve member in the regulating cavity shiftable from one position closing the inlet port through modulating positions uncovering the inlet port to gradually increase flow from the inlet port through the cavity to the radial passage means, one end of the valve member comprising a piston face defining with the walls of the corresponding end of the regulating cavity an expansible static fluid chamber to control the location of the valve member within the cavity, and a pair of static fluid passage means adapted to connect the inlet passage of the first housing of one of the units with the expansible static fluid chamber of the other unit whereby increases in the pressure differential in one fluid source shift a valve member to uncover its associated inlet port and increase the flow from the other fluid source to the outlet passage.

6. An add-on balanced pressure assembly according to claim 5 wherein the second cup-shaped housing of each unit is threadably secured in the first cup-shaped housing of that unit to facilitate access to the valve member, and wherein the static fluid passage means comprises a pair of conduits interconnecting the pair of units.

References Cited

UNITED STATES PATENTS

| | | | |
|---|---|---|---|
| 2,581,855 | 1/1952 | Griffith | 137—98 |
| 3,192,939 | 7/1965 | Moen | 137—100 |
| 3,323,533 | 6/1967 | Reimer | 137—100 |
| 2,020,773 | 11/1935 | Ernst | 251—63 |
| 3,064,676 | 11/1962 | Baker | 251—63 |

FOREIGN PATENTS 1,258,575   3/1961   France.

HENRY T. KLINKSIEK, Primary Examiner

U.S. Cl. X.R.

251—63.5